Nov. 16, 1965   D. M. STEGNER   3,217,964
PLASTIC CLOSURES AND CONTAINERS WITH PLASTIC CLOSURES
Filed Aug. 1, 1963   3 Sheets-Sheet 1
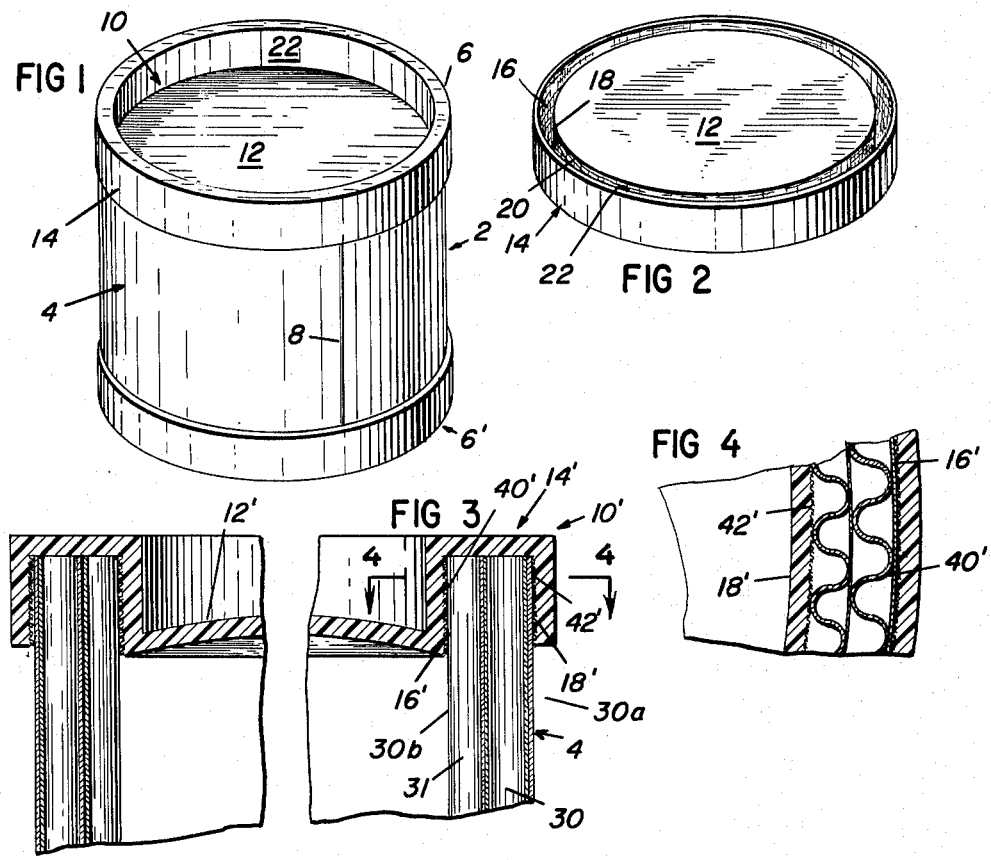
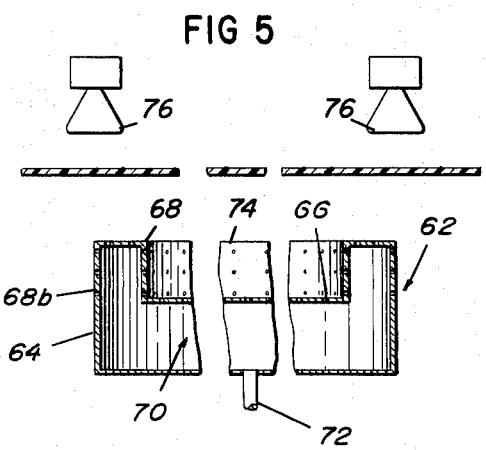
Douglass M. Stegner
INVENTOR
BY Jacobi & Davidson
ATTORNEYS

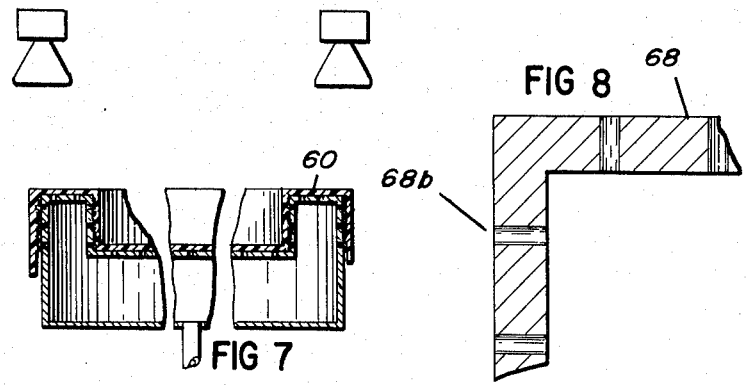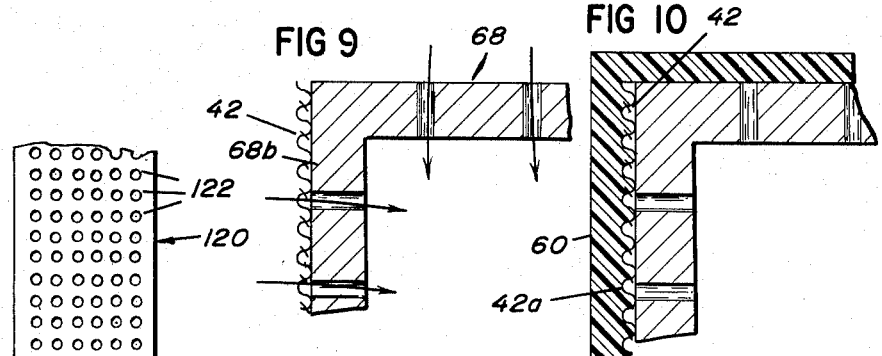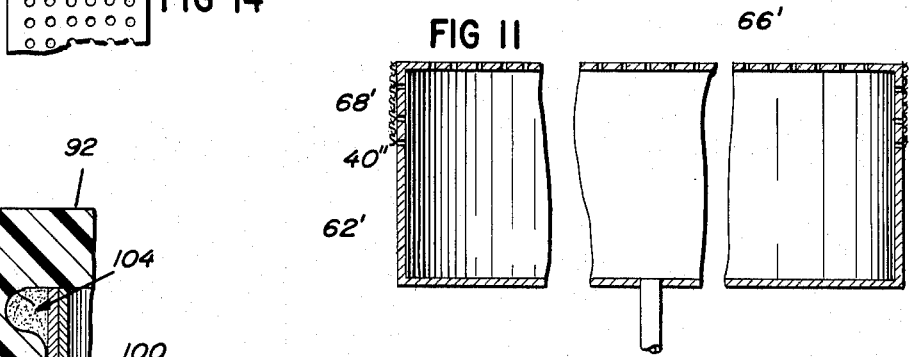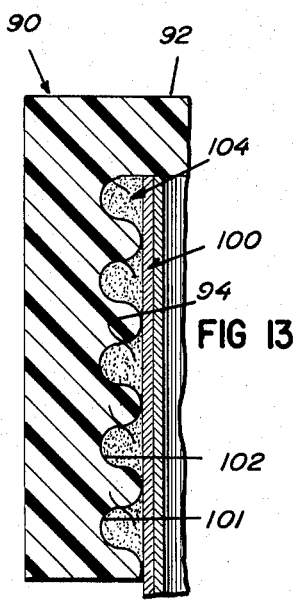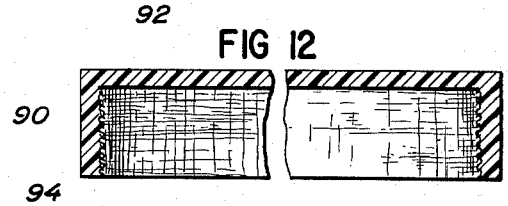

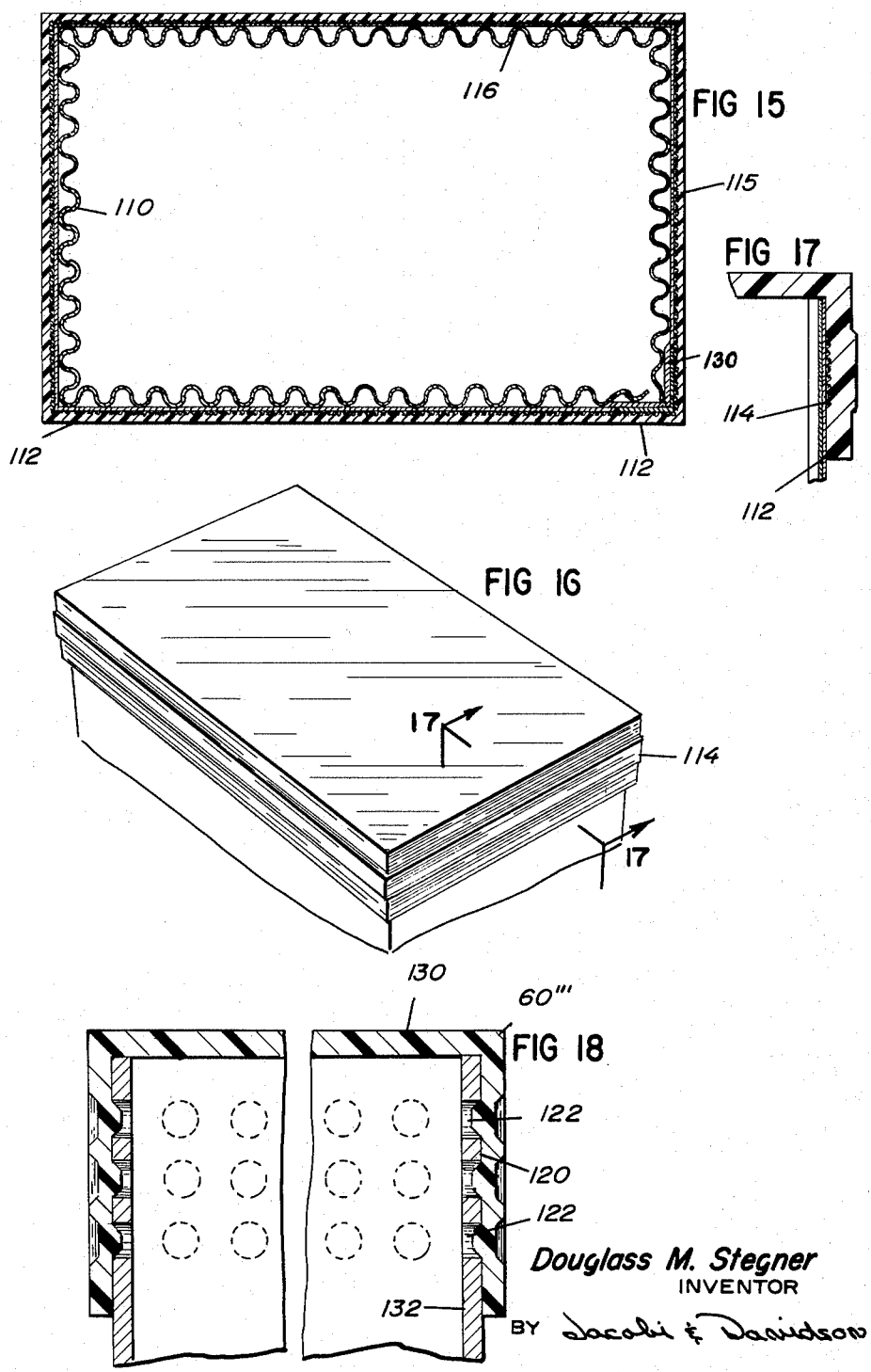

United States Patent Office 3,217,964
Patented Nov. 16, 1965

3,217,964
PLASTIC CLOSURES AND CONTAINERS WITH PLASTIC CLOSURES
Douglass M. Stegner, Baltimore, Md., assignor to Baltimore Box Company, Baltimore, Md., a corporation of Virginia
Filed Aug. 1, 1963, Ser. No. 299,210
6 Claims. (Cl. 229—5.5)

This invention relates generally to containers and container closures, but is specifically concerned with the use of plastics in the formation of closures to be secured on a container structure formed of a material that is not easily bonded to plastics.

With the advent of commercially available plastics—i.e., easily formable synthetic resins—it has become common practice to form various products therefrom due to the inexpensive material costs. Some of such products include container closures. However, the plastic container closures which have been formed previously for use on paper, glass and like containers, necessarily incorporated a positive locking means thereon, such as screw threads or a snap lock, or otherwise they cooperated with the associated container solely through a friction fit or stitching. To use a plastic closure with a paper container, for example, and to secure the closure to the container by an adhesive was impractical because the only adhesives which would effect a positive securing have a prohibitively high cost.

Although paper and plastic have been used in the preceding example to illustrate the securing problem, there are other materials with which plastics are not adhesively or bondingly compatible. Thus, the use of plastic closures at the ends of tubular containers has been substantially limited notwithstanding the possible savings in cost which might be achieved if a solution to the securing problem was realized.

The present invention is directed to solving the aforesaid problem. Specifically, the present invention is directed to the provision of a container closure formed essentially of plastic but carrying a bonding lining therein, which permits the convenient securing of the closure to a container formed of a material not readily susceptible to bonding with plastic.

Consistent with the above, but more specifically one of the important objects hereof is the provision of a plastic closure which can be used with, and positively secured to, a container formed of paper or the like through the use of an inexpensive adhesive, such as, for example, a dextrin based adhesive or a casein based adhesive.

In a more basic sense, it is a primary object of the present invention to provide a plastic closure for the end of a tubular container formed of a material bondingly incompatible with plastic, which closure carries a lining therein that is interlocked with the plastic free of adhesive and at the same time easily susceptible to bonding with the material of the tubular container. In this light, but in more detail, a specific object hereof is to provide a plastic cap carrying a lining therein (a) which lining is secured to the cap skirt by an interlocking cooperation free of adhesive and (b) which lining is receptive to common inexpensive adhesives so as to be easily fixed to a container formed of a material compatible with the adhesive, e.g., paper or paperboard stock.

The use of adhesives in forming the joint between a plastic cap and an adhesively incompatible tubular container body is particularly important because it permits the fabrication and use of inexpensive containers that can be employed, for example, in place of more expensive metal drums such as now used for handling chemicals and the like. However, the invention is adaptable to use with containers susceptible to other types of bonding, such as welding or the like. Accordingly, a general object hereof is to provide a plastic closure carrying a lining therein which is formed of a material bondingly compatible with the material of the container, and wherein the lining is secured within the plastic closure by an interlocking of the material of the closure with the material of the lining. In this regard, a further object hereof is to provide such a closure wherein the interlocking can be readily achieved during a high speed production forming or molding operation used to form the closure itself.

Aside from the product aspects of the invention, there are certain method aspects of importance. In particular, the invention has as one of its more important objects, the provision of a method of making container closures having a lining fixed therein so that the closure conforms with the preceding objects. Additionally, and still related to the method aspects hereof, it is an object of the invention to provide a series of steps which can be carried out to utilize the advantages of vacuum forming techniques to achieve rapid production of plastic container closures readily susceptible to being secured on containers by adhesives which are commercially available and low priced, even where the material of the container is not compatible with plastics insofar as inexpensive bonding therebetween is concerned.

In accordance with the invention from both the product and method standpoints, the container closure is formed essentially of a suitable inexpensive plastic, i.e., a synthetic resin such as polystyrene, polyethylene, polypropylene, or other available inexpensive resin. The closure, as conventional, has a crown portion and a skirt portion so that it fits over the end or other closable opening of the container. The container is formed of a material that is bondingly incompatible with plastics and accordingly with the closure. As indicated above, the invention is particularly important where the container is formed of paper or specifically paper-board stock such as corrugated paper-board stock.

Consistent herewith, the inner wall or walls of the skirt of the closure carry a lining thereon which is bondingly compatible with the material of the container. The lining is not bondingly or adhesively compatible with the plastic, however. Thus, the invention provides for fixing the lining to the closure through an interlocking action which is free of adhesive but which can be achieved during the closure forming operation so as to positively and permanently join the lining to the closure inner skirt surface or surfaces. With this arrangement, an inexpensive adhesive can then be used to secure the lining to the container and to thereby secure the closure to and on the container.

The invention will be better understood, and objects other than those specifically set forth above will become apparent when consideration is given to the following detailed description of illustrative and preferred embodiments hereof. Such description makes reference to the annexed drawings wherein:

In the drawings:

FIGURE 1 is a side elevational view of a completed container constructed in accordance herewith;

FIGURE 2 is a perspective view showing the inner portions of a container closure such as used either at the top or the bottom end of the completed container shown in FIGURE 1;

FIGURE 3 is a transverse sectional view of a modified form of container closure constructed in accordance herewith, and of one end portion of a container body cooperating therewith;

FIGURE 4 is a fragmental detailed sectional view taken on the line 4—4 of FIGURE 3 and showing the relative disposition of the closure skirt walls, the lining layers, and the container walls;

FIGURES 5, 6 and 7 are schematic illustrations representing structural and material features associated with respective sequential steps performed in accordance with the method of the present invention;

FIGURES 8, 9 and 10 are enlarged fragmental views showing a corner portion of a forming area or surface used in carrying out the method hereof, and these figures illustrate in detail the manner in which the lining is applied to the forming area and then interlocked with the plastic material of the closure consistent with the method as illustratively presented in FIGURES 5, 6 and 7 respectively;

FIGURE 11 is a side sectional view illustratively presenting a modified forming surface which can be used to provide a further modified form of container closure in accordance herewith;

FIGURE 12 is a side sectional view of a container closure provided when the forming surface of FIGURE 11 is used;

FIGURE 13 is an enlarged sectional view showing the cooperation and engagement between one skirt portion of the closure of FIGURE 12 and an associated adjacent wall of a container;

FIGURE 14 presents a modified lining material which can be used in accordance with the invention;

FIGURE 15 is a transverse sectional view of a modified container having a modified closure constructed in accordance herewith secured thereto;

FIGURE 16 is a fragmental perspective view of the upper end of an ultimate container embodying the modification of FIGURE 15;

FIGURE 17 is a fragmental sectional view taken on the line 17—17 of FIGURE 16 and showing the band type lining associated with the modification of FIGURES 15 and 16; and, FIGURE 18 is a transverse sectional view of a further modified form of container and container closure constructed in accordance with the invention.

If reference is now made particularly to FIGURE 1, it will be noted that the complete container shown therein is generally designated by the numeral 2. Such container comprises a tubular open-ended container body 4, and a pair of closure means 6 and 6' disposed in closing relation to opposite ends of the tubular body 4.

The container body 4 can be formed in any suitable manner. For example, such body can comprise one or more layers of single face corrugated paper-board stock wound into cylindrical form. The end of the outer layer is joined to an adjacent underlying layer of the body at a conventional joint such as that designated by the numeral 8, and similarly a corresponding joint appears within the container body.

In addition to single face stock, the body may be formed of solid paper-board, of molded pulp, or of other material. The important factor to comprehend is that the body is formed as a tubular structure open at opposite ends, and from a material which is not adhesively compatible with a plastic. As well known in the paper industry, dextrin and casein based adhesives are available at low cost and are completely satisfactory for bonding or securing together surfaces, provided the surfaces are receptive to such adhesives, i.e., bondingly compatible. Because of this circumstance, the tubular body is preferably formed of an inexpensive material receptive to these types of adhesives, namely, paper or paper-board.

It should be here understood that making the body portion of the container from a material which is not adhesively compatible with plastic does not constitute a feature of the invention. Instead, the material from which the body is formed becomes important only because the invention is directed to using a plastic cap with a container body formed of such a material. In other words, the invention is applicable because of the incompatibility from an adhesive standpoint between plastic and paper or paper-board or other materials where common inexpensive adhesives will not provide a bond between such material and plastic. Bearing these factors in mind, attention can now be directed to the closure means.

The closure means 6 and 6' are identical in construction in the arrangement shown in FIGURE 1. Accordingly, only the closure means 6 has been described in detail herein. The closure means 6, as shown in FIGURES 1 and 2, comprises a cap body 10 having a circular crown wall portion 12 and a cylindrical skirt wall portion 14. The skirt wall portion in this instance comprises a U-shaped rim peripherally surrounding the crown wall portion 12. The U-shaped rim provides a continuous recessed area 16 having sides defined by a pair of inner opposed skirt surfaces 18 and 20. Extending between the top of such surfaces is a top rim 22. With this arrangement, the U-shaped rim essentially comprises a pair of spaced concentric ring walls closed at one end by the top rim 22.

The provision of a closure shaped in the manner described above is somewhat conventional. The crown wall 12 of such closure may be flat as shown in FIGURES 1 and 2, or alternatively the crown wall can be arcuately contoured. For example, the cap body 10' shown in FIGURE 3 corresponds in all respects to the cap body 10 described in connection with FIGURES 1 and 2, except the crown portion 12' is spherically contoured within the confines of the skirt wall portion 14'. Due to the likeness between the construction of FIGURE 3 and the construction of FIGURES 1 and 2, prime numerals have been used to designate elements or components in the construction of FIGURE 3 which correspond to like elements or components in the closure means of FIGURES 1 and 2. The cooperation of the FIGURE 3 closure means with the container body walls, as now to be described, is applicable to the arrangement of FIGURES 1 and 2.

The container body 4 is shown in FIGURE 3 as including two layers 30 and 31 of single face corrugated stock wound to provide a cylindrical tubular body, only the upper end of which body 4 is shown. Still, it will be noted that the inner skirt surfaces 16' and 18' are disposed in peripherally facing relation to the inner and outer surfaces 30a and 30b respectively of the container body. Moreover, these inner skirt surfaces are disposed to fit closely adjacent the inner and outer surfaces of the container body walls.

If a plastic cap body 14 or 14' was provided, and if the same was fitted over the end of an associated tubular container body formed of paper stock consistent with the above, then there may be a frictional fit between the cap body and the container body. Still, even if the inner skirt surfaces 16 or 16' and 18 or 18' were coated with a common inexpensive adhesive, there would be no permanent joint between the container body and the closure. As indicated above the common inexpensive adhesives are not compatible with both the plastic and the material of the container body so as to effect a seal or positive and permanent securing therebetween. Such adhesives are compatible with the material of tubular body according to the preferred embodiment since the body is made of paper or paper-board, but the adhesives will not grip with the plastic.

To overcome the securing problem, the cap body 10', or specifically the inner skirt surfaces 16' and 18' carry a lining material or layer thereon. The lining layers carried respectively by the surfaces 16' and 18' of the FIGURE 3 construction are designated by the numerals 40' and 42'. The lining layers are preferably made of a fabric such as cotton, linen, or other inexpensive cloth-like material.

The lining is permanently fixed to and about the inner skirt surfaces by a permanent interlocking between the lining and such surfaces, as explained more fully below. Moreover, as shown in FIGURE 4, the lining layers 40' and 42' cover the surfaces 16' and 18', and thus engage the inner and outer end surfaces 30a and 30b of the container body. The lining, when made of a fabric such as indicative above, is compatible adhesively with the material of the container body. Thus, a common inexpensive adhesive can be applied to either the surface of the lining or the adjacent surface of the container body to secure the lining to the container body. Since the lining is also fixed to the cap body by an interlocking action, the cap body is secured to and on the container body through the adhesive fixing the lining to the container body.

The interlocking relation between the lining and the inner skirt surfaces will possibly be better understood following a discussion of the method aspects hereof. Accordingly, attention is now initially directed to FIGURES 5 through 7. In FIGURE 5, a sheet of plastic stock 60 is shown as disposed above a forming area generally designated by the numeral 62. The forming area is provided by a forming block 64 which has a first apertured surface portion 66 contoured as a crown wall, and a second apertured surface portion 68 contoured as a skirt wall portion for a closure formed thereon. Specifically, the forming area 62 is shaped in this instance to ultimately provide a closure body such as designated by the numeral 10 in FIGURES 1 and 2. The forming block 64 has a hollow interior 70, and a conduit 72 leads into such area. With the apertures in the first and second surface portions 66 and 68, a vacuum applied through the conduit 72 will exist adjacent the apertures in the surface portions, such apertures being designated by the numeral 74.

Consistent with conventional vacuum forming techniques, the sheet of plastic stock 60 would be heated by any suitable heaters, such as the radiant energy lamps 76, so that such stock is formable under vacuum forces. Following the heating, the sheet would be placed, as heated, in overlying relation to the forming area 62 whereby the vacuum would cause the sheet to conform to the surfaces 66 and 68 of the forming area. It is realized that there is a technical question as to whether the vacuum would cause the stock to conform to the contour of the forming area, or whether the outside air pressure would render such result due to the existence of the vacuum. This question is of little importance in the instant situation, since the significant factor is that the sheet of plastic stock is heated and then shaped to conform to the contour of the forming area due to the vacuum effect.

Even though the above described basic vacuum forming operation is somewhat conventional, the invention departs from conventional practice. Specifically, in accordance herewith, a layer of lining material is placed in overlying relation to each of the upstanding wall portions 68a and 68b of the surface portion 68. The lining material is itself porous, and thus the vacuum is applied not only over the exposed surface 66 and exposed parts of surface 68, but also adjacent the surfaces of the layers of lining material.

From FIGURE 6, it should be apparent that the layers 40 and 42 (of FIGURE 2, but corresponding to layers 40' and 42' of FIGURE 3) of the lining material essentially comprise rings which are placed in position prior to moving the sheet stock 60 sufficiently close to the forming area 62 for the vacuum forming of the sheet stock. Once the lining layers are in position, and once the sheet stock has been sufficiently heated, then the same is moved downwardly in overlying adjacent relation to the forming area 62, and at this time the material is caused to conform to the surfaces or surface portions 66 and 68 due to the vacuum effect.

When being moved under the action of the vacuum and/or the surrounding air pressure, into conformance with the forming area, the sheet stock is soft and pliable. Thus, the existence of the vacuum on the surface of the lining material, the sheet stock is essentially pressed against the lining material and through an interlocking, the plastic stock and the lining material become laminated.

The sequence described above is possibly shown in somewhat more detail in FIGURES 8 through 10. In FIGURE 8, the wall 68b of the surface 68 is shown as free of any lining thereover. In FIGURE 9, the lining is shown in covering relation to the wall 68b, but the arrows indicate how the vacuum is drawn through the lining 42. In FIGURE 10 the interlocking between the fabric or lining 42 and the plastic stock 60 is shown most clearly. It will be noted that thread portions 42a of the lining 42 extend randomly within the plastic stock 60 and that the plastic stock 60 fills the voids of the lining 42. This mutual engagement between the sheet stock and the lining provides a positive laminate permanently fixing the lining to the sheet stock free of any adhesive.

The same basic operations would be performed whether the closure was to ultimately have the shape shown in FIGURES 1 and 2, the shape shown in FIGURE 3, or even the shape shown in FIGURE 12. To make the shape of FIGURE 3 merely requires spherically shaping the wall or surface 66 of the forming area 62. To make container closure 90 shown in FIGURE 12 requires the use of a forming area such as that designated by the numeral 62' in FIGURE 11. In this latter instance, only one layer of lining material 40'' is placed about the skirt-forming surface 68' since the crown forming surface 66' extends entirely about the forming area. The cap body of FIGURE 12 is a completely conventional cap having a crown portion 92 and a depending skirt portion 94. Here again, as with the embodiments already described, the closure is cylindrical and is adapted to cooperate with a cylindrical tubular container body portion. However, as explained below, other shapes can be used.

Regardless of the particular shape ultimately desired for the closure, it should be apparent that basically the same method steps would be performed in providing the closure. Specifically, a forming area is provided having a first apertured surface portion contoured as a closure crown wall and a second apertured surface portion contoured as a closure skirt wall or wall portion. A layer of lining material is placed in covering relation to at least a portion of the forming area contoured as a skirt wall. A sheet of plastic stock is heated to render the same formable under vacuum forces, and a vacuum is drawn through the surfaces of the forming area and through the lining material. The sheet of plastic stock, as heated, is placed in overlying relation to the forming area such that the vacuum causes the sheet stock to conform to the crown and skirt wall surfaces of the forming area and to interlock with the layer of lining material.

Once the forming operation is completed, the formed sheet stock with the lining material interlocked therewith is removed from the forming area, and excess material trimmed from the formed closure. If the forming area 62' of FIGURE 11 is used, then the ultimate closure would be like that designated by the numeral 90 in FIGURE 12. Such closure would be applied to a container in the manner shown in FIGURE 13 which presents one side portion of the closure 90 affixed to the side wall 100 of a container body.

The side wall 100 can well be the outer wall or surface of the container body 4 of FIGURE 1. The inner skirt surface 101 of the skirt wall portion 94 of the closure 90 peripherally faces the wall 100 of the container adjacent an open end of the container. As indicated above, the crown wall portion 92 and the skirt wall portion 94 are integrally formed from a plastic material which differs from the material of the container body. The plastic material consists essentially of a plastic synthetic resin and preferably a thermosetting synthetic resin. The lining material designated by the numeral 102 in FIGURE 13 is made of a material different than the plastic material, namely, a material such as discussed in connection with the lining 40 or 42. The lining 102 is permanently fixed to and about the inner skirt surface 101 by a permanent interlocking between the lining and the surface 101 or the skirt wall portion 94. This interlocking is free of adhesive and results from the inter-engagement of the lining material with the plastic forming the skirt wall portion 94.

A securing means 104 bonds the lining 102 to the periphery of the container wall 100, with the crown portion 92 of the closure 90 disposed in closing relation to the open end of the container body. The securing means 104 comprises a layer of adhesive material bondingly compatible with the material of the container wall 100 and the material of the lining 102, but not bondingly compatible with the plastic material from which the crown and skirt portion of the closure are formed.

It will be appreciated that with the invention, the formable properties of the plastic are used to maximum advantage to secure the lining within the skirt portion, and then the receptiveness of the lining to inexpensive adhesives is used to maximum advantage to secure the lining to the container body through the use of such an adhesive. The compatibility of the adhesive to the lining and to the material of the container body is essential, and permits the use of a plastic cap even though the plastic is not adhesively compatible with the adhesive used to fix the lining to the container body. In essence, the invention resides in the compatibility of the bonding agent with the lining and the material of the container body and the incompatibility of the bonding agent with the plastic material of the cap.

In the preceding description, it has been assumed that the container body is cylindrical in shape and that the closure means associated therewith are correspondingly cylindrical. However, shape is not important. As shown in FIGURE 15, a parallelogram container body formed of double-faced corrugated stock can be used. Such body, designated by the numeral 110 cooperates with a parallelogram closure 112. The closure 112, aside from being parallelogram in shape, corresponds with the closure 90 of FIGURE 12. The inner skirt surface 112a has a lining layer 114 fixed thereto by an interlocking such as described above. An adhesive layer 115 secures the lining to the outer surface 116 of the tubular container body 110. The arrangement of FIGURE 15 is shown in perspective in FIGURE 16. From this latter figure, as well as FIGURE 17, it will be noted that the lining layer 114 does not completely cover the skirt surfaces 112a but instead, extends in exposed relation continuously thereacross as a band spaced from both the top and bottom edges of the skirt inner surface.

Using a lining band such as 114 may result in a slight bulge in the skirt wall 112, as best shown in FIGURE 17 due to the inherent characteristics of stock flow during the plastic forming operation. Still, the inner skirt surface in the embodiment of FIGURES 15 through 17 is flat with the lining band providing part of the exposed surface and the plastic providing the remaining parts above and below the lining band.

As a further alternative construction, the lining may be made of a material which is less porous than a fabric. Such material may, for example, comprise paper stock. If this alternative is adopted, the lining may appear as shown in FIGURE 14. Such lining 120 has a plurality of perforations 122 therein making the lining porous and such that a vacuum can be easily drawn therethrough. This type of lining would again provide an interlock, and may well provide such interlock through fibrous engagement with the plastic. Alternatively, however, the lining 120 may have some thickness as shown in FIGURE 18. If this be the case, during the forming operation the plastic stock 60''' which forms the plastic cap body 130 would be drawn such that it partially flows within the apertures 122. The engagement between the material of the cap body and the apertures here again provides an interlock free of adhesive. The lining 120 being compatible with the material of the container 132 of FIGURE 18 can be easily joined thereto by a bonding agent adhesively compatible with the lining 120 and the material of the container body 132, but compatible with the plastic forming the cap body 130. With the arrangement of FIGURE 18, the lining can even comprise a metal and the container body can also comprise a metal, in which event spot welding between the container body and the lining is feasible with the welding material serving as the bonding agent.

Although various embodiments and modifications have been described above, there are certain factors which are generally important but which have not yet been discussed in detail. For example, the closure means are adapted to close both ends of the tubular body open at opposite ends. Thus, where a pair of identical closure means would be formed for use therewith, and such closure means would be applied to the body as shown in FIGURE 1 and fixed thereto in the manner described above. Of course, it will be understood that merely one closure means may be used where the container is only open at one end.

An additional factor of particular significance herein concerns the meaning of certain terms such as "bondingly compatible," "lining layer" and "plastic." "Compatible," as used herein, means bondingly compatible through the use of a common inexpensive bonding agent. In this sense, as indicated above, plastic and paper are incompatible.

The term "lining layer" as used herein refers to the lining which may comprise a single ply of material or a plurality of joined plies of material. In other words, a lining layer generically means a liner regardless of its thickness. The important consideration is that the lining has sufficient thickness to present a bonding surface to the container wall thereadjacent, while at the same time providing for a proper interlock with the plastic. Preferably, however, the lining is fibrous where adhesives are to be used.

The term "plastic" as used herein refers to synthetic resins which can be easily formed or molded through known techniques such as vacuum forming techniques and injection molding techniques. Preferably, however, the plastics are of a thermosetting nature. Thus, in addition to the plastics named specifically above, phenol formaldehyde resins can be used for the plastic.

Structurally, there are certain additional features of the lining that are important. First, for a proper seal, the lining should be continuous about the inner skirt surface or surfaces of a closure carrying the same. The continuous nature permits achieving a complete seal about the wall of a container with which the closure hereof is associated. Further, in some instances, it is preferable to make the lining as a band such as shown in FIGURE 17, because this construction not only secures the lining in position through an interlock, but additionally, such construction prevents lateral shift of the lining since both side edges thereof are engaged by the adjacent plastic.

Now, with respect to the cap body, it will be understood that the same should be non-porous where sealing is important. However, in some instances, such body can be porous as where sealing is not the important factor. Regardless of the porosity of the cap body, the same is shaped, as desired, to provide the needed strength in the ultimate container. For this purpose, the embodiment of FIGURE 3, for example, affords greater strength than the embodiment of FIGURE 12. Still, the shaping can vary with particular requirements of a given container, and the more significant consideration is the fact that a lining is used, which lining is interlocked with the closure, and which lining affords a means of bonding incompatible surfaces.

Having now described the invention in considerable detail with respect to preferred embodiments, it should be apparent that the objects set forth at the outset of the present specification have been successfully achieved.

What is claimed is:
1. A closure for a container comprising:
 (a) a solid non-porous cap body having a crown wall portion and a skirt wall portion;
  (1) said skirt wall portion having an inner skirt surface for peripherally facing a wall portion of a container adjacent an open end thereof;
  (2) said crown wall portion and said skirt wall portion being integrally formed from a plastic synthetic resin material, and,
 (b) an adhesive-receptive porous layer,
  (1) said porous layer being fixed to and in at least partially exposed covering relation about said inner skirt surface free of adhesive and by an interlocking of the material of said porous layer and the plastic synthetic resin material of said skirt wall portion,
  (2) said interlocking of the materials of said porous layer and said skirt wall portion including at least a partial embedding between the material of said porous layer and the synthetic resin material of said skirt wall portion.
2. A closure for a container comprising:
 (a) a cap body having a crown wall portion and a skirt wall portion;
  (1) said skirt wall portion having an inner skirt surface for peripherally facing a wall portion of a container adjacent an open end thereof;
  (2) said crown wall portion and said skirt wall portion being integrally formed from a plastic synthetic resin material, and,
 (b) an adhesive-receptive porous fibrous layer,
  (1) said porous layer being fixed to and in at least partially exposed covering relation about said inner skirt surface free of adhesive and by an interlocking of the material of said porous layer and the plastic synthetic resin material of said skirt wall portion with at least some fibers of said porous fibrous layer at least partially embedded into said synthetic resin material.
3. A closure as defined in claim 2 wherein said fibrous layer consists essentially of a fabric.
4. A closure as defined in claim 2 wherein said porous fibrous layer comprises apertured paper stock.
5. A closure as defined in claim 2 wherein said porous fibrous layer comprises a continuous band.
6. In combination with a tubular open ended container body formed of a first material: a closure means for said container body, said closure means comprising:
 (a) a cap body having a crown wall portion and a skirt wall portion;
  (1) said skirt wall portion having an inner skirt surface for peripherally facing a wall portion of said container adjacent an open end thereof;
  (2) said crown wall portion and said skirt wall portion being integrally formed from a second material different than said first material and consisting essentially of a plastic synthetic resin.
 (b) a fibrous lining;
  (1) said lining being permanently fixed to and about said inner skirt surface by a permanent interlocking between said lining and said skirt wall portion,
  (2) said permanent interlocking between said lining and said skirt wall portion including at least a partial embedding of said lining into said skirt wall portion, and
 (c) securing means bonding said lining to the periphery of said container body with said crown portion disposed in closing relation to said open end of said container body;
  (1) said securing means comprising an adhesive bondingly compatible with said first material and the material of said lining but not said second material.

References Cited by the Examiner

UNITED STATES PATENTS

| | | | |
|---|---|---|---|
| 2,304,684 | 12/1942 | Fitch. | |
| 2,350,950 | 6/1944 | Wiley | 229—5.8 X |
| 2,455,063 | 11/1948 | Jackson | 93—55.1 |
| 2,471,017 | 5/1949 | Wilcox | 229—5.5 |
| 2,584,633 | 2/1952 | Southwick. | |
| 2,731,190 | 1/1956 | Farrell | 229—5.5 X |
| 2,990,998 | 7/1961 | Barclay | 229—43 |

FRANKLIN T. GARRETT, *Primary Examiner.*

GEORGE O. RALSTON, *Examiner.*